United States Patent [19]

Middleton et al.

[11] Patent Number: 4,589,107
[45] Date of Patent: May 13, 1986

[54] SIMULTANEOUS VOICE AND DATA COMMUNICATION AND DATA BASE ACCESS IN A SWITCHING SYSTEM USING A COMBINED VOICE CONFERENCE AND DATA BASE PROCESSING MODULE

[75] Inventors: Francisco A. Middleton, Sandy Hook; Santanu Das; Nicholas J. R. Carter, both of Shelton, all of Conn.

[73] Assignee: ITT Corporation, New York, N.Y.

[21] Appl. No.: 595,087

[22] Filed: Mar. 30, 1984

Related U.S. Application Data

[63] Continuation of Ser. No. 445,625, Nov. 30, 1982, abandoned, and Ser. No. 445,626, Nov. 30, 1982, Pat. No. 4,488,287, and Ser. No. 433,335, Oct. 17, 1982, abandoned.

[51] Int. Cl.⁴ .................. H04Q 11/04; H04M 3/00
[52] U.S. Cl. ................................. 370/62; 370/58; 179/18 BC
[58] Field of Search ............. 370/62, 58; 179/18 BC

[56] References Cited

U.S. PATENT DOCUMENTS

| | | | |
|---|---|---|---|
| 3,903,373 | 9/1975 | Gueldenpfennig et al. | 179/18 BC |
| 4,027,098 | 5/1977 | Reisch et al. | 179/18 BC |
| 4,150,259 | 4/1979 | Fenton et al. | 179/18 BC |
| 4,153,817 | 5/1979 | D'Ortenzio | 179/18 BC |
| 4,466,093 | 8/1984 | Renner | 370/62 |

Primary Examiner—Douglas W. Olms
Assistant Examiner—Wellington Chin
Attorney, Agent, or Firm—Peter C. Van Der Sluys

[57] ABSTRACT

A combined telecommunications and data communications system operates by partitioning data wherein the PCM speech transmission data field is used to contain both digitized speech and other data in the same channel within a frame. Thus the system enables speech and data to be combined in a common information field and to be simultaneously transmitted in the same channel, frame by frame, through a digital switching network. The switching network contains a common port which has a digital interface connected to the port which digital interface can separate and combine the speech and the data fields. The digital interface is connected to a conference module which conference module receives the speech fields via a speech bus. The digital interface is further connected to a data base system which data base system receives the separated data fields via a data tone bus. Through the unique use of a digital interface for combining and separating speech and data fields from the information field of a channel, a conference module and a data base may both be connected to a single port thereby reducing the number of ports and network channels required for simultaneous conferencing and data base access.

9 Claims, 11 Drawing Figures

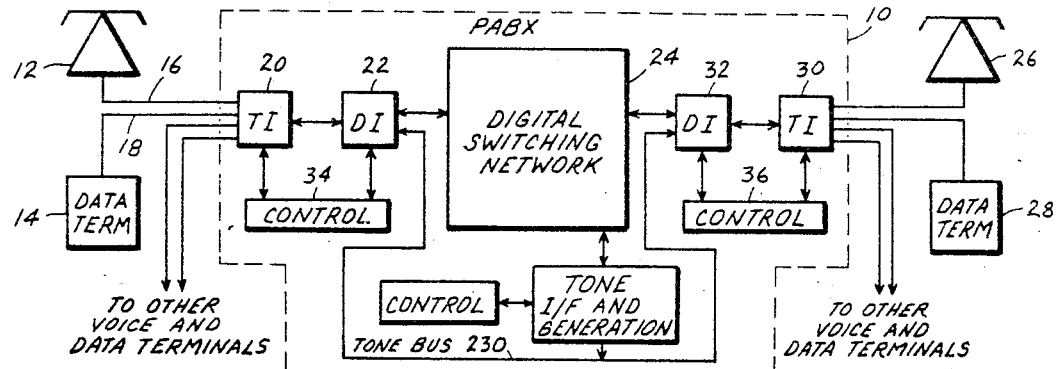
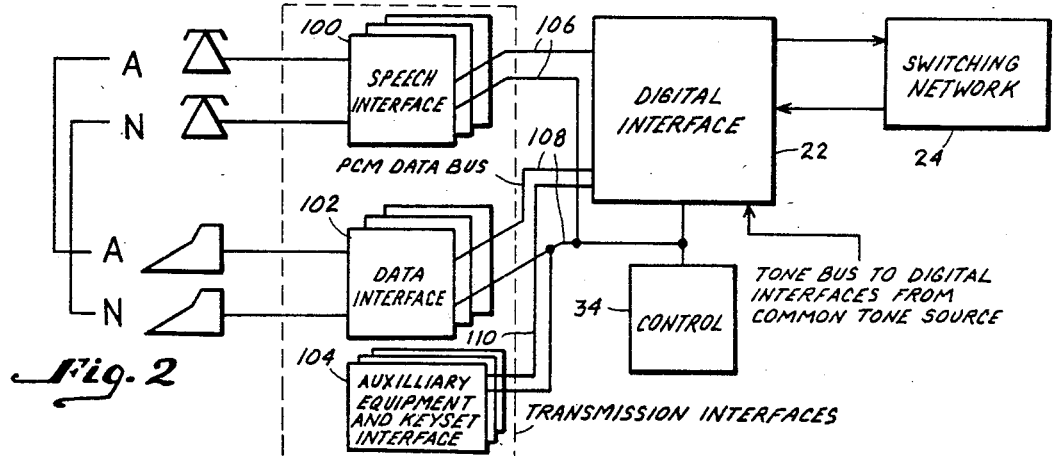
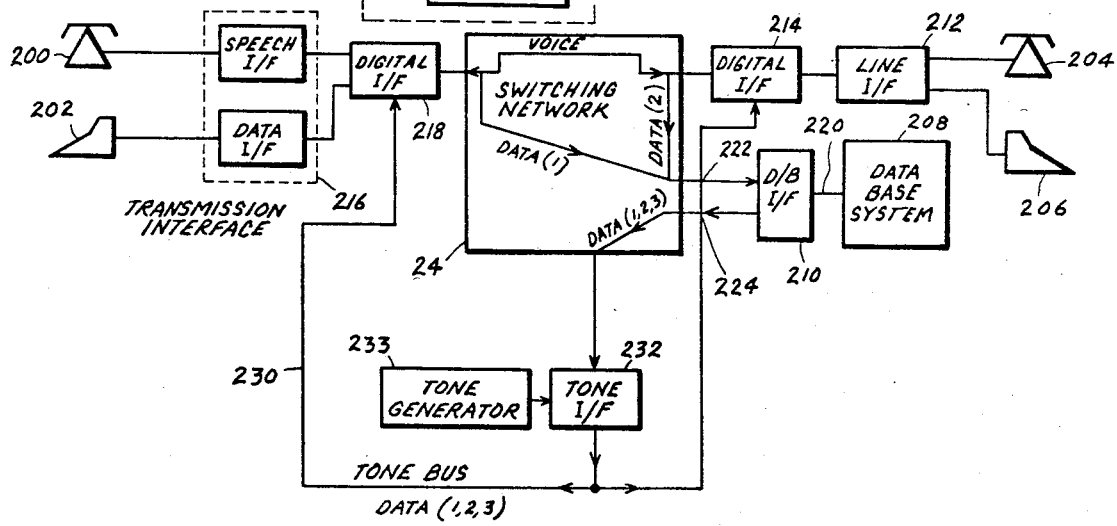

SIMULTANEOUS VOICE AND DATA COMMUNICATION AND DATA BASE ACCESS IN A SWITCHING SYSTEM USING A COMBINED VOICE CONFERENCE AND DATA BASE PROCESSING MODULE

CROSS REFERENCE TO RELATED APPLICATIONS

This application is a continuation of application Ser. No. 445,625, filed Nov. 30, 1982, entitled "Voice and Data Switching In Electronic Private Automatic Branch Exchange", now abandoned, and application Ser. No. 445,626, filed Nov. 30, 1982, entitled "Combining and Splitting of Voice and Data from Multiple Terminal Sources", now U.S. Pat. No. 4,488,287, and Frank A. Middleton, Ser. No. 433,335, filed Oct. 17, 1982, "Handling of Multiple Subscriber Terminations Simultaneously by Use of a Phantom Multiplexing Technique of Two Pairs of Wires", now abandoned.

BACKGROUND OF INVENTION

1. Field of the Invention

The invention relates generally to the fields of digital data communications and telecommunications, and specifically to apparatus and method for simultaneously transmitting speech and data in the same communications channel between two or more terminals, each of which terminals includes a voice and data capability, such as a telephone and data terminal. The invention is particularly applicable to Electronic Private Automatic Branch Exchanges (EPABX) having voice and data capabilities, of office automation equipment, telephone systems, engineering work stations, and intelligent terminals. Data may be used by end user terminals or for control and signalling between source and destination of the voice path.

2. Description of the Prior Art

Various PABX equipment is known in the prior art, representative of which are U.S. Pat. Nos. 3,943,297; 4,028,498 and 4,136,263. First generation EPABX equipment had stored program control, and used either electromechanical switching networks, such as Xbar or reed relay; or electronic analog networks. These systems provided greater capabilities than those of a standard telephone set by activation of special codes which were deciphered by the system.

The second generation EPABX of the prior art uses digital switching networks configured either as time-space-time (TST) or space-time-space (STS), resulted in substantial size reduction. Examples of such second generation EPABX equipment are ROLM CBX and Wescon digital PABX.

Telephone instruments are evolving toward multi-function devices providing both speech communication and data transmission requirements from, in effect, a digital data interface. Thus the telephone set effectively is evolving toward the digital data interface and the EPABX to a digital data switching network as well as the standard voice network. It is therefore necessary to transmit digitized speech and data through a digital switching network. A digital switching network able to switch digitized speech and data through the network is described in U.S. Pat. No. 4,201,891 entitled Expandable Digital Switching Network, of A. Lawrence et al and is assigned to the assignee of the present invention. Another example of a switching system for voice and data is U.S. Pat. No. 4,317,962 of J. Cox et al, also assigned to the assignee of the present invention. The present invention, which may be considered to be fourth generation EPABX technology, is capable of providing simultaneous transmission of speech and data in the same PCM channel, and is particularly advantageously utilized in combination with digital switching networks such as that of aforementioned U.S. Pat. No. 4,201,891 wherein digitized speech and data are transmitted in the same PCM channels. However, in U.S. Pat. No. 4,201,891 the digitized speech and data are transmitted sequentially, whereas in the present invention, the digitized speech and data are transmitted simultaneously, e.g. within the channel times of each frame.

SUMMARY OF THE INVENTION

The present invention discloses a data partitioning technique wherein the PCM speech transmission data field is utilized to contain both digitized speech (for example, from a telephone) and other data (for example, from a data terminal) in the same channel within a frame having a plurality of channels e.g. 32 channels, of information. This enables the speech and data to be combined in a common information field and simultaneously transmitted in the same channel, frame by frame, through a digital switching network to other system users. Also, in accordance with the present invention, system users can individually selectively access a data base system through the switching network, such that the same information can be broadcast from the database system to a plurality of system users, or such that different information can be accessed in the database system by a plurality of system users and simultaneously transmitted to different users in different channels. A novel technique for transmitting information from the database system via a telecommunication systems tone bus interconnecting the system is described.

To provide the capability of simultaneous speech and data switched to the same subscriber by a digital switching system such as that described by the aforementioned U.S. Pat. No. 4,201,891 it has been discovered that the spare five bits of the 16-bits PCM words per channel may be dedicated to data transmission with one bit taking two frames to transmit. The 5-bit and 8-bit information fields are not separated, but the complete channel is transmitted to both data and speech destinations. The destination equipment, a data terminal or key telephone set, etc. then separates out the information field it requires. Alternatively, the data and speech fields may be separated in the PABX and transmitted/received from the data terminals and telephone sets independently. A system in accordance with the present invention combines the 5-bit and 8-bit data and speech information fields into one channel, thereby enabling the two fields to be transmitted simultaneously to a destination such as a key telephone subscriber with a digital telephone. Of course, when such a terminal does not require/permit simultaneous communication of speech and data, it may be used to communicate with other data terminals, using data in the speech path as the transmission medium, with modems as is currently done in the prior art. This does not preclude the additional sending of 5-bit data if desired.

By way of example, a switching network termination to digital telephone can provide a transmission path for 8-bits of digitized speech and 5-bits of data. Speech and data originating at one terminal can be switched via a digital switching network to two or more destinations independently combined in a 16-word PCM channel. At a digital interface, speech and data bits mapped from two separate network PCM channels can be extracted for sending to a single digital telephone.

Data can be switched to terminals from a data source via the telephone tone bus. The tone bus provides for example approximately 20 free channels for high speed (64K bit/second) transmission of large amounts of data using the speechpath, and 5-bits per channel per frame can be used to provide a 32K bit/second serial path for up to thirty terminals concurrently, independent of the use of the speech paths.

It is, therefore, a primary object of the present invention to provide simultaneous transmission of voice and data in the same channel between one or more end user terminations.

It is another object of the present invention to provide simultaneous in-channel voice and data communication between a plurality of system users.

It is another object of the present invention to provide simultaneous in-channel voice and data communication between one or more system users and a database system.

It is another object of the present invention to provide for a plurality of system users to simultaneously transmit or receive speech and data selectively to each other individually or in a broadcast mode, and to simultaneously access a database system such that each system user can receive the same or different data from the database system, simultaneously over the system tone bus together with one or more other system users.

The foregoing and other features and advantages of the invention will become apparent with reference to the following detailed description thereof taken in conjunction with the accompanying drawings, wherein:

BRIEF DESCRIPTION OF THE DRAWINGS

FIG. 1 is a generalized block diagram illustrative of a PABX incorporating provision for the simultaneous full duplex transmission of voice and data to two-port system users.

FIG. 2 is a generalized block diagram of the system of FIG. 1 adapted for use by a plurality of two-port system users.

FIG. 3 is a generalized block diagram of the system of FIGS. 1 and 2 expanded to a three-port system providing voice and data transmission and access to a database system.

DESCRIPTION OF THE PREFERRED EMBODIMENT

Figure 4:
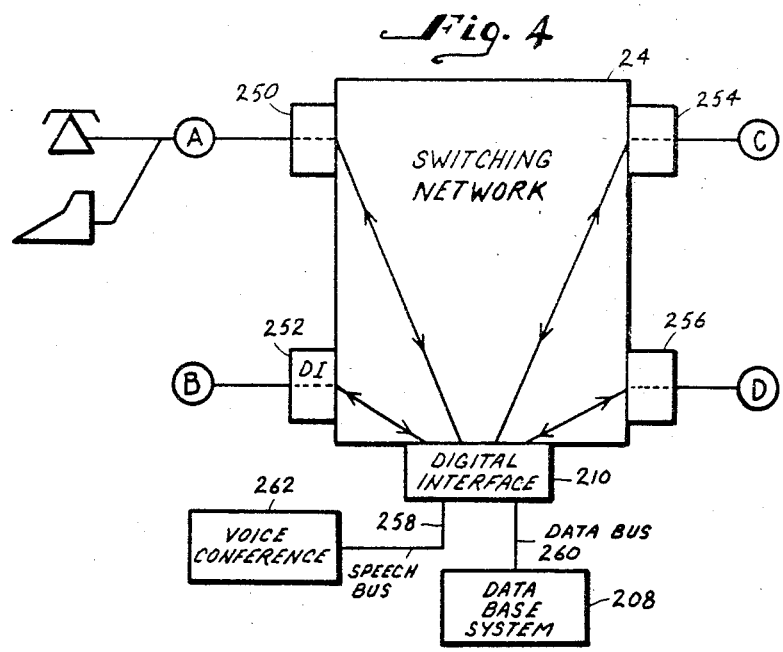
FIG. 4 is a generalized block diagram of four system users, each having voice and data capability and interconnected through a digital switching network to each other and to a database system.

Referring to FIG. 1, the simultaneous transmission of voice and data in a two-port communication system is illustrated. Voice and data are coupled to a Private Automatic Branch Exchange (PABX) 10 from a plurality of voice and data terminals, one of which voice terminals is illustratively shown as telephone subscriber set 12 and one of which data terminals is illustratively shown as data terminal 4.

Telephone subscriber set 12 and data terminal 14 are coupled via two-wire lines 16 and 18 to a transmission interface circuit 20 in PABX 10, which is adapted to received both analog and digital information. Telephone subset 12 could comprise a telephone keyset, with keyset signalling being coupled over two wire pairs 16 and 18 in accordance with the phantom multiplexing technique described in copending U.S. patent application Ser. No. 433,335 of F. Middleton, which is assigned to the same assignee as the present invention.

The transmission interface 20 may be comprised of a telephone line circuit, including a CODEC and BORSCHT circuits of known design, such as are described for example by U.S. Pat. Nos. 4,161,633 of R. Treiber; 4,317,963 of R. Chea; 4,270,027 of B. P. Agrawal et al; and 4,272,648 of B. P. Agrawal et al, which are representative of various telephone line circuits for interfacing analog and/or digital transmission inputs to a digital line which are all assigned to the assignee of the present invention and to which reference may be made for details of a suitable transmission interface.

Digital data from terminal 14 on line 18 is comprised of, for example, 8-bit data words encoded in standard HDB-3-code in conventional manner. Other codes such as bipolar AMI (alternate mark inversion) and Manchester Code could be used. The data is arranged to obtain positive and negative pulses and also to enable recovery of a clock. A conventional RS-232 interface modem for a computer terminal interface may be alternately used for this purpose, being utilized at each end of the line 18.

Digitized voice and digital data are coupled to a digital interface circuit 22 to provide a full duplex communication link between digital interface 22 and a digital switching network 24, with half duplex links provided between transmission interface 20 and data terminal 14 and subscriber set 12. Alternatively, full duplex transmission may be provided in a known manner to PABX 10 by well known ping-pong or echo cancelling techniques or by 4-wire lines. Digital Switching Network 24 preferably comprises a distributed control switching network, the details of which are described by U.S. Pat. No. 4,201,889. Digital Switching Network 24 couples frames of channels of digitally encoded data and digitized speech from any desired subscriber or data terminal to any other desired telephone subscriber or data terminal.

FIG. 1 representatively shows the interconnection of subscriber 12 and data terminal 14 to subscriber 26 and data terminal 28 via switching network 24. Terminal interface 30 and digital interface 32 function in identical manner as do terminal interface 20 and digital interface 22. Control circuitry 34 and 36, as described hereinafter and in referenced U.S. Pat. No. 4,201,889, functions to establish and maintain transmission paths within the switching network 24. Control circuitry 34 and 36 also contains processing capability to handle protocols between the digital interfaces 22 and 32 respectively to subscriber sets and data terminals. Control circuit 34, for example, may comprise an Intel 8086 microprocessor for use for example in detection of OFF HOOK signalling and in applying ringing tones such as is described in U.S. Pat. No. 4,349,703 of R. Chea assigned to the assignee of the present invention.

Referring now to FIG. 2, a simplified block diagram of the interconnection of a plurality of speech and data terminals to the PABX arrangement of FIG. 1 is illustrated. Telephone subscriber sets A through N are coupled to analog speech interface 100 portion of the transmission interface 20. Data terminals A through N are coupled to the data interface 102 of transmission 20. Auxiliary equipment 104 common to telephone line circuits as aforementioned is also included herein, for example ringing signal generation as described in the aforementioned U.S. Pat. No. 4,349,703, also interfaces to key set for control/data exchange with control 34. While only one plane of the transmission interfaces 20 is shown, it is understood that multiple identical planes can be utilized in a PABX, and the use of such multiple planes in a switching network is well known and described in the aforementioned U.S. Pat. No. 4,201,891. Pulse Code Modulated (PCM) speech and data buses, shown illustratively at 106, 108 and 110 respectively, are bidirectional in that each bus includes a pair of unidirectional transmission paths, each being dedicated to one direction of data flow. Each unidirectional transmission path of 106, 108 and 110 carries, for example, thirty-two channels of digital information, time division multiplexed (TDM) in bitserial format. Each frame of TCM form is comprised of the thiry-two channels with each channel having, for example, 16-bits of information at a bit transmission rate of 4.096 Mb/s. PCM speech and data buses 106 and 108 respectively are coupled to digital interface circuit 22 wherein speech and data are combined as hereinafter described for simultaneous transmission through the switching network 24. The keyset interfaces are coupled to the digital interface by the transmission path 110. As aforementioned, control processors 34 and 36 function to perform path set up through the network 24.

Referring now to FIG. 3, a three-port system is illustrated wherein a voice or data system user at port-1 including subscriber set 200 and data terminal 202, can communicate selectively with either port-2 or port-3. Port-2 includes another voice and data system user at subscriber set 204 and data terminal 206. Port-3 includes a database system including a data processor 208 and a data base system including a data processor 208 and a database interface at 210. Processor 208 may comprise any equipment, for example, a stored program computer having data stored therein for retrieval by users at ports 1 and 2. Interface 210 functions to connect data streams directly to PCM channels, and includes a digital interface such as digital interface 22 in accordance with the present invention described hereinafter. Similarly, port-2 is connected through transmission interface 212 and digital interface 214 to switching network 24. Port-1 is connected to switching network 24 via transmission interface 216 and digital interface 218.

The three-port system of FIG. 3 is a full duplex system wherein both subscribers 200 and 204 have a simultaneous voice connection with common interaction via their respective data terminals 202 and 206 respectively with a database system 208. In accordance with a feature of the present invention, both subscribers 202 and 206 can (a) interact with a common database 208 such that they each get identical data returned from the database 208, even though each subscriber may transmit different data, or (b) get different data back at each subscriber from the database. Line 220 comprises a high speed parallel data bus. Digital interface 210 performs a serial/parallel conversion, channel allocation and synchronization for two-PCM links at 222 and 224 of, for example, 32 channels each.

The broadcasting of digital information from one port to multiple ports is known, and is described in detail by U.S. Pat. No. 4,293,946 of M. Kuras et al, assigned to the assignee of the present invention. FIG. 3 illustrates the transmission of data and digitized speech through network 24 between ports 1 and 2 and the database at port 3. Even though it is known to broadcast speech or data to multiple ports in the speech field, e.g. U.S. Pat. No. 4,293,946 of M. Kuras et al, the problem remains to combine data in the number of bits (5-bits, for example) of the data word being used. Thus one must be able to get digitized speech from port 1 to port 2, and data from port 1 to port 3. This is accomplished by broadcasting a single data word which contains both digitized speech and data in a combined information field to both destinations (port-2 and port-3). At the digital interface 214 of port-2, the speech only is retrieved and the data is ignored (discarded). At digital interface 210 of port-3, the data only is retrieved and the speech is ignored (discarded). Likewise, to transmit speech and data from port-2 to port-1 and port-3 respectively, the same technique is effectively used.

However, a problem arises in the prior art in getting data back from port-3 (the data base system) to both port-1 and port-2 and delivering it to the same terminals which are transmitting. The 16-bit PCM could be broadcast in a like manner to that described above, but it only uses 30 percent of the available bandwidth, and uses up another available speech channel at ports 1, 2. Thus an additional broadcast and combination means is effectively required. The following will disclose that the already existing tone bus of a telephone PABX can effectively serve this purpose. Alternatively, a separate broadcast bus may be provided solely for this data purpose in addition to whatever tone distribution mechanism exists in the PABX even if such tone distribution mechanism is of a similar kind. The tone bus 230 may be, for example, a 32-channel PCM transmission link which runs between each digital interface 218 and 214 of each telephone subscriber port, such as port-1 and port-2. The conventional use of a tone bus in a telephone subscriber network is to switch audio tones such as ringing, busy signal, music-on-hold etc. so that a telephone subscriber hears the tones on the tone bus. Since each telephone subscriber is always connectable to the tone bus 230, i.e. each of the 32-channels on the tone bus can be coupled to each telephone subscriber, both subscribers at port-1 and port-2 can be connected to data transmitted in any one of the 32-channels from port-3. In the event that subscribers at port-1 and port-2 require different data from port-3, then data can simply be transmitted through the tone bus 230 in different channels of the 32 channel TDM PCM data frame. The tone interface is shown at 232 and the tone generator at 233. It is sufficient for an understanding of the present invention that tone generation and transmission circuitry is known in the prior art of telephony. A suitable tone bus configuration is shown with reference to FIG. 8. While the database interface circuitry 210 may be similar to the digital interfaces 214 and 218, it is to be understood that only the data insertion and extraction capability is required, hence digital interface 210 for the database system 208 could be comprised of any known data insertion and extraction circuitry.

Referring now to FIG. 4, a simplified block diagram illustrative of the connection of four individual system users A, B, C and D, each having a voice (telephone) and data (terminal) capability to a database system 208 is shown. A plurality of channels in frames of PCM speech and data are switched through the digital switching network 24.

Speech and data from users A, B, C and D are combined at digital interfaces 250, 252, 254 and 256 respectively, into digital words representative of speech and data and are partitioned onto two buses 258 and 260 by digital interface 210. Bus 258 is a digitized speech bus and bus 260 is a data bus. Speech bus 258 connects users A, B, C and D to a conferencing circuit 262 to provide simultaneous voice connection to all users. The conferencing circuit may comprise, for example, the conferencing ciruit described by the aforementioned U.S. Pat. No. 4,293,946 of M. Kuras et al. The data bus 260 simultaneously connects all users to the database system 208 to individually send or retrieve data therefrom. The retrieved data can be common data broadcast to some or all users or different data for each user. Database system 208 could be an Intel 8086 microcomputer or an IBM 370, depending upon the scale of data required by the users. The database system would typically have computing ability in addition to database access, to manipulate and compute data patterns or number representations.

Figure 5:
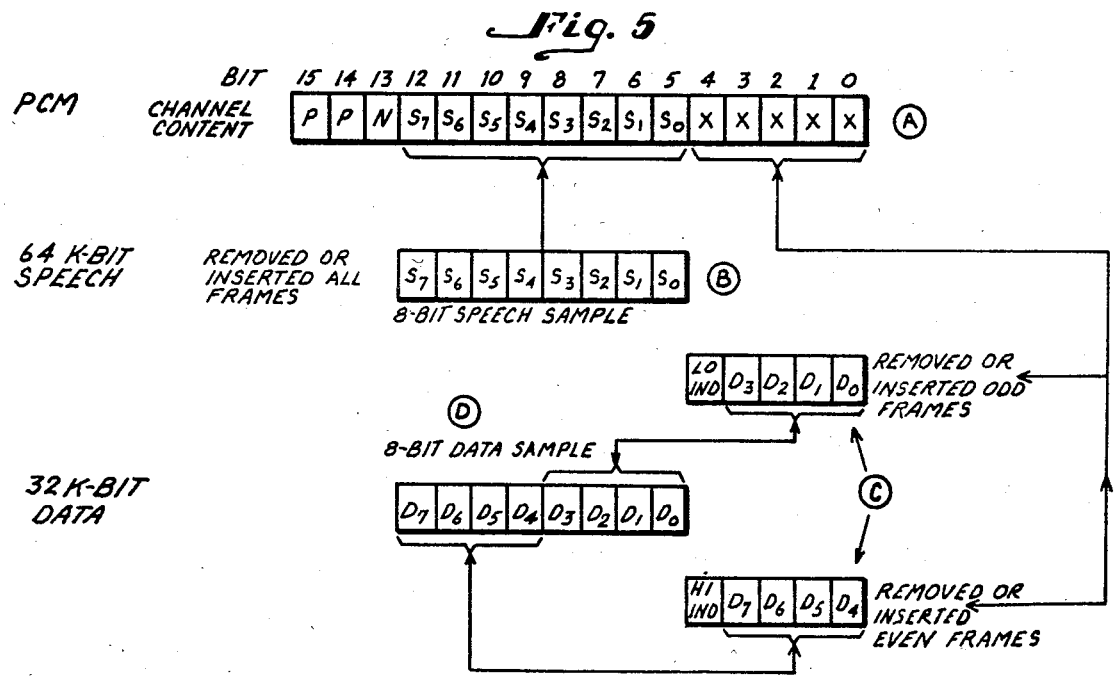
FIG. 5 illustrates a data format for combining digitized speech and data in the same channel for simultaneous transmission, in accordance with the present invention.

Referring now to FIG. 5, the data format utilized to provide simultaneous speech and data transmission in the block diagram of the digital interface illustrated by FIG. 6 will now be explained. A 16-bit or 8-bit format is used generally in telephony. Format A represents the 16-bit PCM channel format content of one of the 32 channels of a data frame used in this implementation. A specific bit designations are:

P=Protocol: 2 bits
N=SPARE: 1 bit
S=Speech: 8 bits
X=Data: 5 bits

It is to be understood that the protocol bits P in the system described may be a SPATA protocol such as "10" as described in the aforementioned U.S. Pat. No. 4,210,891 of A. Lawrence et al. The transmission rate is typically 4.096 M bit/s. ·

Format B is the 8-bit digital speech sample for the channel word in A. It is a digital representation of an analog speech sample commonly used in telephony. The 8 bit digital speech sample is either extracted or inserted in all frames of channels. The speech sample is removed or inserted when the interface to speech transmission interface from the digital interface is 8 bits ×32 channels per frame. When PCM speech bus 106 of FIG. 2 has 16 bit words, then the speech samples do not need to be inserted or removed. However, the speech samples may more readily be inserted or removed on a per termination basis at the speech interface 100 such as described in aforementioned U.S. Pat. No. 4,201,891. The speech transmission rate is 64K bits/s, which is derived from 8K frames/s and 8 bits/channel per frame.

Format C illustrates two 5-bit data words which are alternately inserted into the data field (the X-bits) of the 16-bit PCM format A. Only the first 4-bits of the 5-bit data field are valid data. The additional bit is used to indicate which of the removed or inserted odd or even portions C of D is represented. The additional bit, either hi or low (1 or 0) is sometimes called a "nibble indicator", and each 5-bit data "nibble" from 8-bit data word D has an opposite nibble indicator from each other, i.e. the nibble indicators are never both 0 or both 1.

Thus the 5th bit in each nibble C is used for framing of the two 4-bit nibbles within the 8-bit data word D. The data word D has a transmission rate of 32K bit/s. For combined fields, the samples C are inserted for transmission - through the digital switching network. For separated fields, the samples C are extracted upon reception from the digital switching network.

Figure 6:
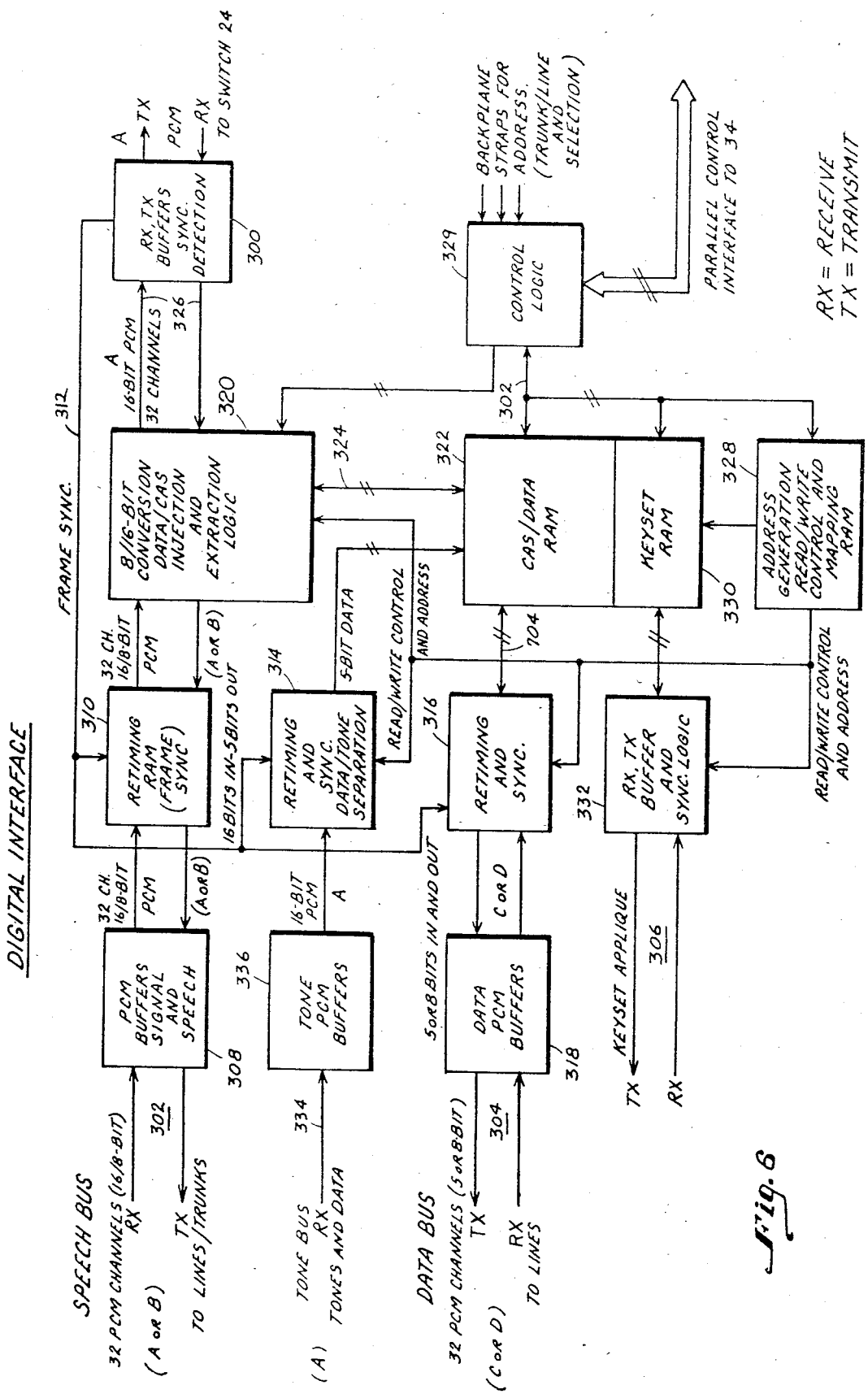
FIG. 6 is a block diagram of a digital interface in accordance with the present invention.

Referring now to FIG. 6, the digital interface circuit 22 is illustrated. Frames of PCM channels of speech and data in format A of FIG. 5 are transmitted to and received from the switching network 24 on Tx and Rx lines, which are coupled to a synchronization detector and buffer 300. The PCM input from switching network 24 is used to resynchronize all the other inputs to the digital interface 22. Thus, insertion and removal of data is done in synchronization with the frame and channel sync received from the digital switching network 24. There is thus a fixed timing relationship between the input from switching network 24, the digital interface 22 operation, and transmission via lines/trunks to users via the transmission interface 20 to lines 302 (the speech bus), lines 304 (the data bus), and lines 306 (for keyset applications). PCM in A or B data format from user terminals speech bus 302 is buffered by PCM buffers 308 and coupled in 32 channel A or B format to a retiming RAM 310 for retiming to the switching network data framing sync, which is coupled from buffer 300 by line 312 to retiming RAM 310, retiming RAM and data/tone separation circuit 314, and retiming RAM 316.

The retiming RAMs are memories into which information is written in frame sync with received data from the lines and is accessed and read out in sync with the internal digital interface timing. Each retiming RAM has an address counter (not shown) which is incremented each channel time-channel N, N+1, N2 ... so that serial 8-bit bytes are written into subsequent locations in memory. The address counter counts to thirty-two, then starts again at the same frequency, but at a different phase. For addresses at a 2.048 M bit/s serial 8-bit data bit rate, the counter counts at a 256K bit/s counting rate. Logic is also provided (not shown) to initialize and synchronize the address counter to the A or B frame timing.

Figure 7:
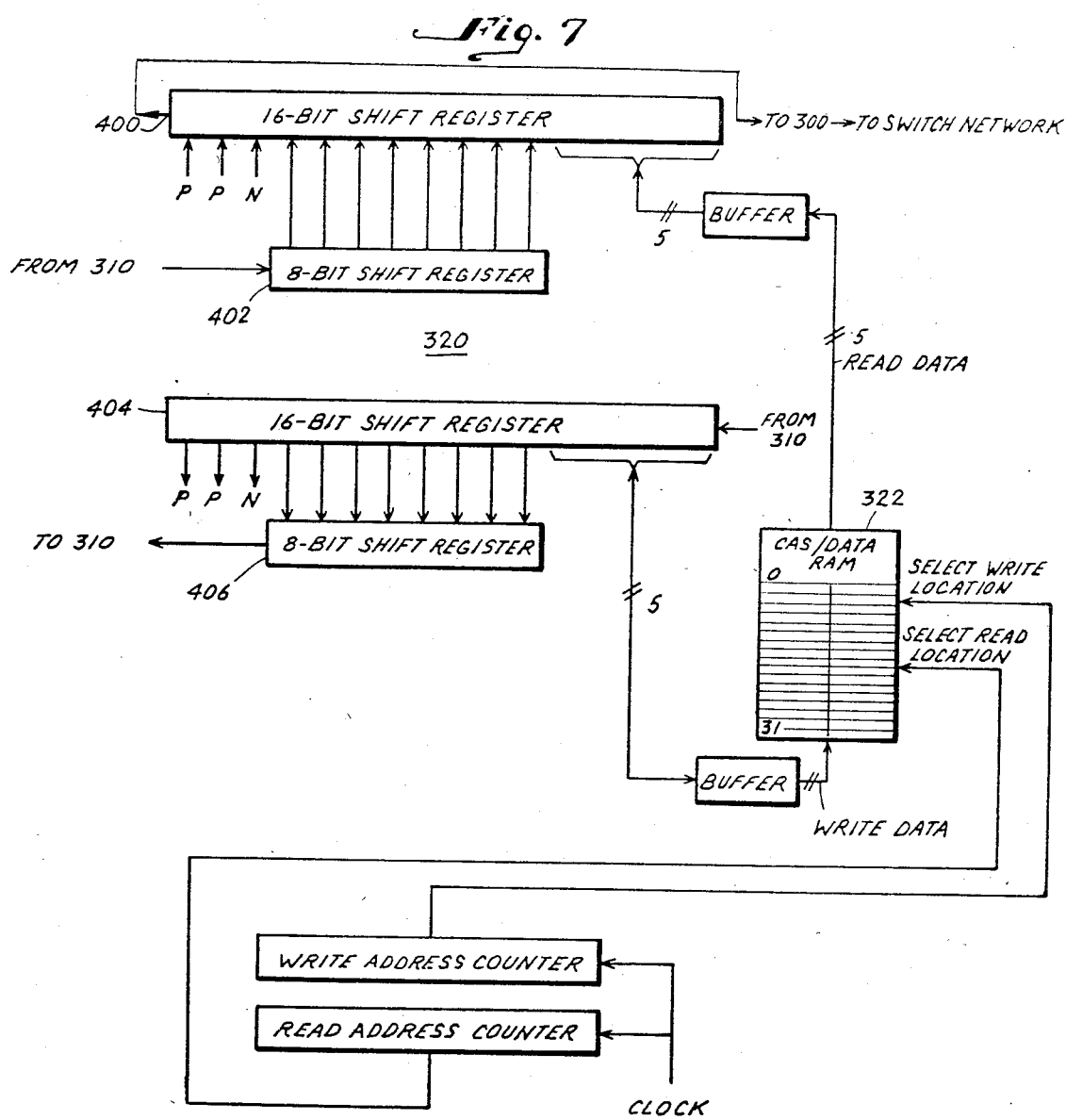
FIG. 7 is a shift register configuration useful in converting data words of one bit length to data words of another bit length.

Eight-bit PCM speech is inserted in a 16-bit field to form the switching transmission format. This is accomplished by an 8-to-16 bit conversion in 8/16 bit conversion circuit 320, which is shown in FIG. 7. When channel associated signalling (CAS) or data is to be mapped into the 16-bit channel, it is read from the CAS/DATA RAM 322 and inserted into the PCM word stream in addition to the speech field. When Channel Associated Signalling is used, it is inserted/removed from the speech field. The 16-bits are transmitted to the switching network 24 via line 324, 8/16 bit conversion circuit 320 and lines 326 in 16-bit format/channel. The CAS part of the CAS DATA RAM 322 has a memory map 8-bits wide and 128 locations, each of 8-bits (one per channel). The data part of the CAS/DATA RAM is 128 locations each of 4-bits. Operation of the CAS part of the RAM is described later. Where and how these locations are provided will be explained subsequently. DATA is read out of the data part of the CAS/DATA RAM 322 one-half word at a time (plus an indicator bit) added as it is read, as specified by an address counter (not shown) associated with RAM 322 and which receives its input from address generation read/write control 328. The address counter for RAM 322 cycles around through each channel. The memory map is accessed and data is read and inserted into memory. The memory map 328 receives and stores a data pattern from control logic 34 that when reread locally in 328 enables data reads/writes to the DATA RAM on a per channel basis from the various sources. A key set RAM 330 is structured similarly to CAS/DATA RAM 322, and contains 2 to 2N memory word locations (assuming separate transmit-Tx and receive-Rx locations), depending upon the number of channels (N) of data it is desired to send to a keyset. Keyset sync and buffer 332 is provided with read/write control from RAM 328, as are retiming circuits 314 and 316 and 8/16 bit conversion circuit 320. Data to be sent/received from the keyset is written to or read from the keyset RAM by the control logic 34 via the local control logic 329 on the parallel control interface. The control logic 34 can similarly read/write to the CAS RAM 322 for the transfer of information.

Data in C or D format is coupled from the data bus 304 via data PCM buffer 318 to the retiming RAM 316. Data is received on data bus 304 in sequential channels in which data in 5-bit or 8-bit fields is embedded at a maximum effective bit transfer rate of 32K bit per second per channel. When the data field received on bus 304 are 8-bits long, they are converted to 5-bit fields, which includes a "nibble" bit. If a lesser bit rate is needed, the data can be sent in burst mode intermixed with "filler" non data bits which may be sent when data is not sent. Alternatively less than the maximum of the bits may be used for data transfer to effect a low rate. When the data fields are 5-bits long, they include the nibble bit already. The data is retimed to the switch frame sync at 316 and written into CAS/DATA RAM 322 as 4-bit fields, the nibble bit defining an odd or even address in the RAM.

Heretofore, transmission to the switching network and data insertion has been described, including simultaneous transmission of data written during the prior 31 channel times.

Transmission from the switching network 24 to the lines and data extraction will now be described. Data is received from the switching network 24 at sync detector 300 in 16-bit format, and sync is extracted. Eight bit speech is extracted at 8/16 bit conversion circuit 320 and written into the retiming RAM 310 or is coupled directly to PCM buffer 308. If Channel Associated Signalling or data is mapped to the particular channel, the DATA/CAS field is extracted at 320 and written into CAS/DATA RAM 322. If data is mapped to the tone bus 334, for receipt at tone port 336, the tone bus data field is extracted at retiming, sync and data/tone separation circuit 314 and is written into the CAS/DATA RAM 322 under control of the address generation and read/write control 328. Data is transmitted simultaneously, i.e. within the next 31 channel times, simultaneously transmitted data are read from the CAS/DATA RAM 322 in a 4-bit field and are either combined to an 8-bit field or left as 5-bits, (4-bits plus the odd/even address nibble indicator bit) are retimed to the output PCM bit stream at 316 and transmitted on line 304 (and other lines at other digital interfaces 22 of identical configuration as that of FIG. 6). As already specified, the timing of the switching network 24 PCM information can be asynchronous in phase to all other data -- which is a characteristic of the switching network 24, as described in the aforementioned U.S. Pat. No. 4,201,891 of A. Lawrence et al. The CAS/DATA insertion, extraction and PCM retiming for all PCM digitized speech and data and tones from trunks and lines are synchronized to the PCM information received from switching network 24.

The control logic 329, which includes backplane inputs and address straps inputs for line/trunk selection, and an interface to a microcomputer, the control 34 of FIG. 1, such as an Intel 8086, is of conventional circuitry and provides standard means for interfacing to the microcomputer. Thus the control logic 329 provides a path for control words from the microcomputer to set and reset words in the mapping RAM 328 to govern data flow, which effectively permits the microcomputer to read/write to the CAS/DATA RAM 322 and to the keyset RAM 330. As a standard interface between the microcomputer and the rest of the digital interface 22, the control logic 329 includes conventional register buffers, decoders, address generation and recognition registers and initialization control.

Referring now to FIG. 7, the 8/16 bit conversion circuit 320 as coupled to CAS/DATA RAM 322 is illustrated in simplified manner. The circuit provides 8/16 bit conversion, injection and extraction of data/-CAS. The circuit 320 is comprised of serial-to-parallel 16-bit and 8-bit shift registers 400, 402, 404 and 406 which provide a serial data in to parallel data out, and parallel data in to serial data out as illustrated. Counters cycle through each of channels 0-31 to insure that data is clocked through the registers in the correct channel. The protocol and NACK bits are fixed for consistency with requirements of the particular switch implementation.

Figure 8:
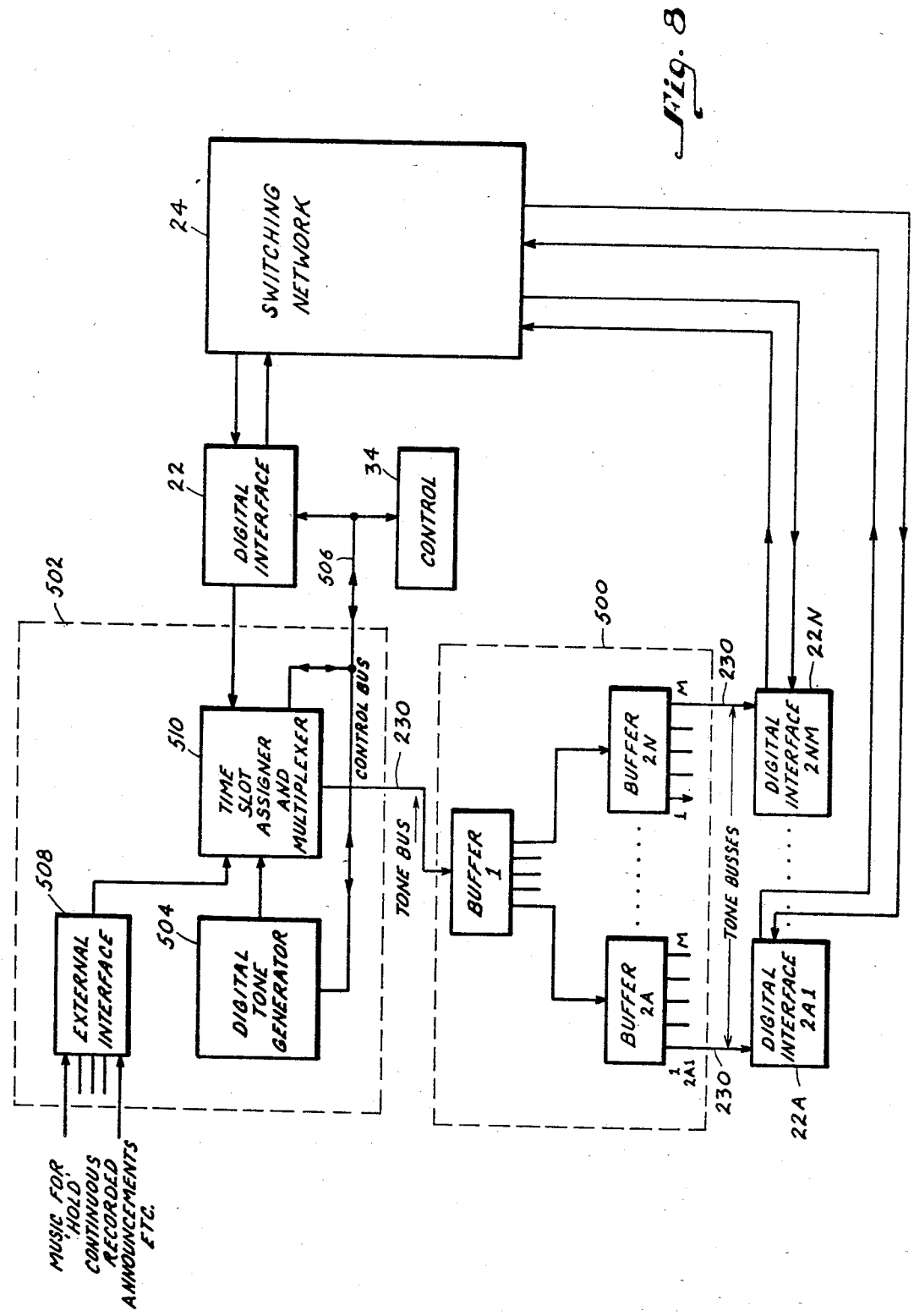
FIG. 8 is a tone bus configuration suitable for use in the present invention.

FIG. 8 illustrates the tone bus circuitry and distribution from its generation through a heirarchy of buffers to a plurality of digital interfaces. The tone bus 230 is a phase asynchronous 32-channel 16-bit PCM digital stream as in the switch network 24. The tone bus is distributed via a heirarchy of buffers 500 to a plurality of digital interfaces shown as 22, 22A . . . 22N, coupled to the switching network 24 or other required destinations. Digital interfaces 22A and 22N are illustrative of many digital interfaces having tone buses ditributed via buffers 1, 2A, . . . 2N, i.e. tone buses 230, two of which are shown as 2A1 and 2NM.

The tone circuit 502 consists of a digital tone generator 504 that produces digital PCM sequences at 8KH$_z$ per 8-bit sample for various tones used by the exchange (or PABX). These tones may be programmable in the frequency, amplitude, harmonic content and other parameters by means of the control 34 which couples instructions to the tone generator 504 on the control bus 506.

An external interface 508 converts or receives external sources such as music, continuous announcements, etc. and encodes these to 8-KH$_3$, 8-bit PCM streams. A time slot assigner 510 receives 32-channel 16-bit PCM from the digital interface 22 under control from the control 34 and inserts the 8-KH$_3$ 8-bit PCM samples from digital tone generator 504 and the external interface 508 into assigned channels of the PCM frame in the speech field. The digital interface 22 receives the 5-bit data field as described in PCM data from the switch network 24 and passes this data on to the time slot assigner 510 to multiplex with the other 8-bit 8KH$_z$ inputs, to form the 16-bit PCM words on the tone bus 230.

Figure 9:
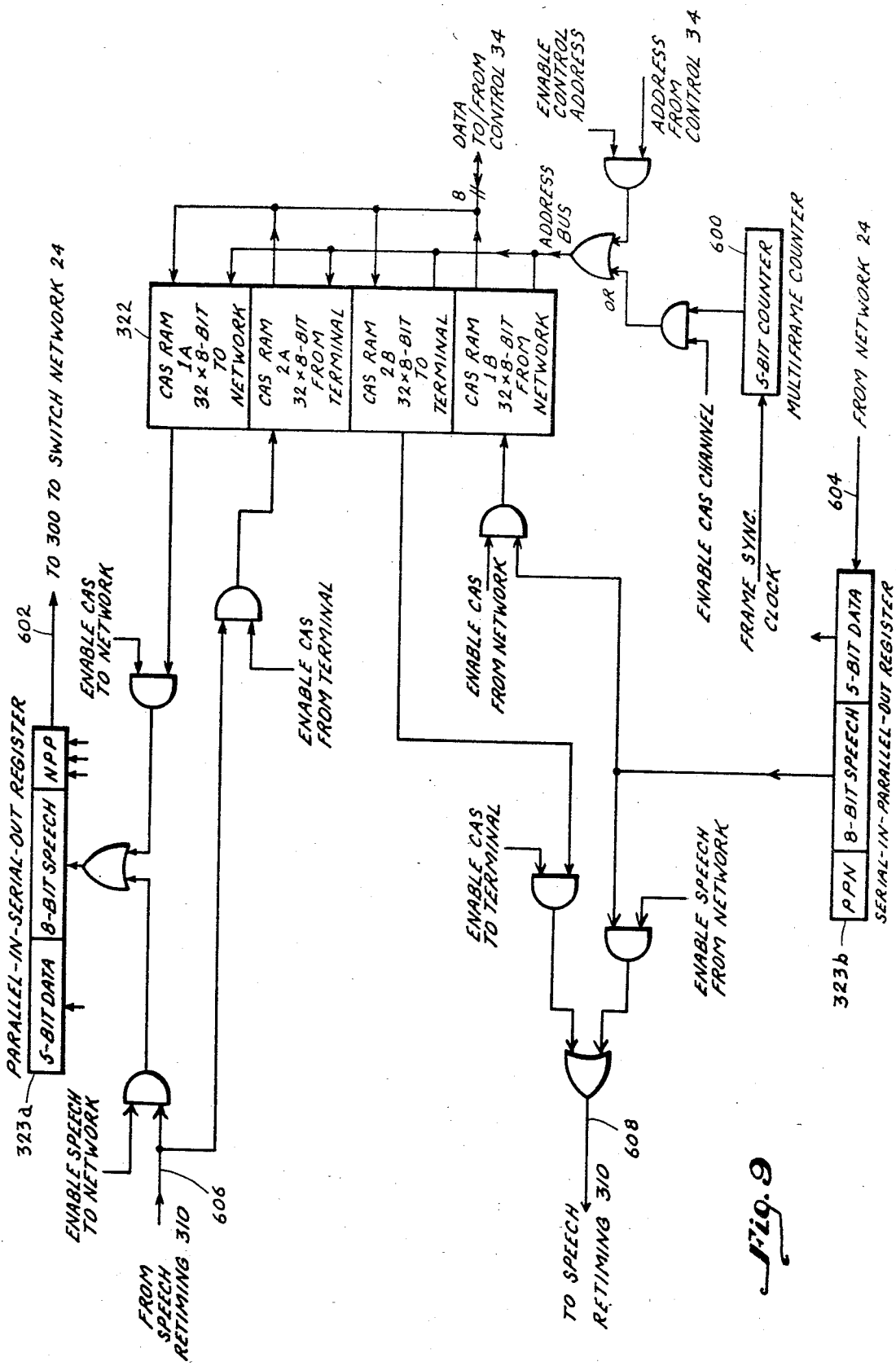
FIG. 9 illustrates data flow for Channel Associated Signalling (CAS) in the speech path between CAS/DATA RAM and serial-to-parallel data conversion circuitry.

Referring now to FIG. 9, data from Channel Associated Signalling (CAS) in the speech path between CAS/DATA RAM 322 and serial-to-parallel conversion circuit 320 is shown. Parallel-in-serial-out register 323a and serial-in-parallel-out register 323b correspond to register 400 and 404 respectively of FIG. 7.

CAS is data inserted in subsequent frames of the PCM stream in one channel, inband, forming a repetitive sequence known in telephony as a multiframe. When the appropriate channel is transmitted from or received into the digital interface 22, the content of the speech field is loaded from or to the CAS RAM 322. The control 34 can then write or read the CAS RAM 322. The control 34 can then write or read the CAS RAM 322 to send or receive control or signalling information. CAS capability both into the switch network 24 or to the terminal is provided. The use of the same channel as the CAS channel is used for signalling into the network or towards the terminal.

A counter 600, 5-bits for example, is incremented each frame by frame clock to create a multiframe data sequence of 32-frames, providing for receipt and transmission of $8 \times 32 = 256$ bits of signalling in each direction on lines 602, 604, 606, and 608. Transparent speech transfer can be enabled on this channel when the CAS information is not received or transmitted. Channel mapping, if required, is described herein elsewhere.

The CAS RAM 322 comprises four sections, each for example, of 32-locations of 8-bits. The four sections of CAS RAM 322 are: 1A, which serves as a buffer for data from control 34 to network 24; 1B, which serves as a buffer for data from network 24 to control 34; 2A which serves as a buffer for data from a subscriber terminal via line 606 to control 34; and 2B, which serves as a buffer for data from control 34 to a subscriber terminal via line 608.

Figure 10:
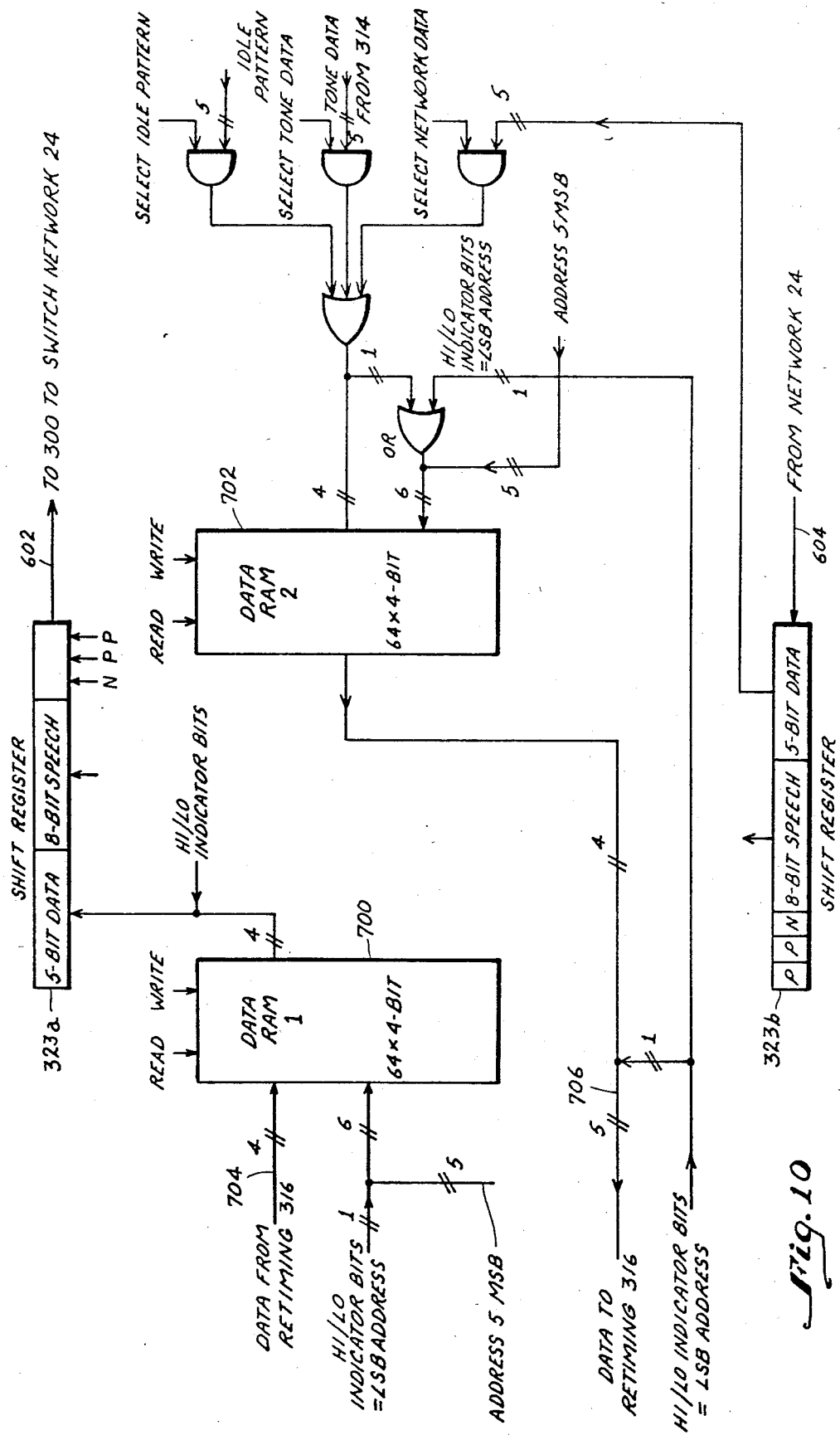
FIG. 10 illustrates nibble data insertion and extraction between CAS/DATA RAM and serial-to-parallel conversion circuitry.

Referring now to FIG. 10, nibble data insertion and extraction between CAS/DATA RAM 322 and serial-to-parallel conversion circuitry 323 is described.

Data, originally 8-bits, is held in two $64 \times 4$-bit RAMs 700 and 702, wherein each contiguous pair of locations within the RAMs contains both nibbles of the 8-bit byte, and such that the least significant bit (LSB) of address which distinguishes the adjacent locations serves as the HI/LO nibble indicator.

The data RAM portion of the CAS/DATA RAM 322 can be considered as two identical sized sections. DATA RAM 1, shown at 700, is used for buffer and channel mapping from terminal to network. DATA RAM 2, shown at 702, is used for buffer and channel mapping between data sources and a terminal or terminals.

The DATA RAM 700 has as its address for reading, the data output channel mapped to the PCM channel that is about to be transmitted to the network. The DATA RAM 700 content at this address is loaded to the shift register 323a prior to shifting the PCM channel to the network 24.

The DATA RAM 700 has as its address for writing, the number of the channel of the data received from the terminal. Thus at the network PCM channel to be sent, the data is fetched from the mapped location in RAM 700 by the data channel address fetched from the mapping RAM 800, described with reference to FIG. 11.

DATA RAM 702 has as its address for reading, the count of the channel of the data being sent to a subscriber terminal. The address for writing of DATA RAM 702 is the data input channel number fetched from the mapping RAM 800 by access of the location in the mapping RAM 800 addressed by the channel count of the received PCM from the network 24. Thus data is mapped to the network channel on line 602 from the data channel on line 704 and from the network channel on line 604 to the data channel on line 706.

There are two other sources of data to be written into the DATA RAM 702, which are selected as a result of the mapping RAM 800 content. These other sources of data are tone data, or an idle pattern, which is used when neither network nor tone data are connected to the data terminal.

The high/low nibble indicator is used as the LSB of address for writes and reads to the RAMs 700 and 702.

Figure 11:
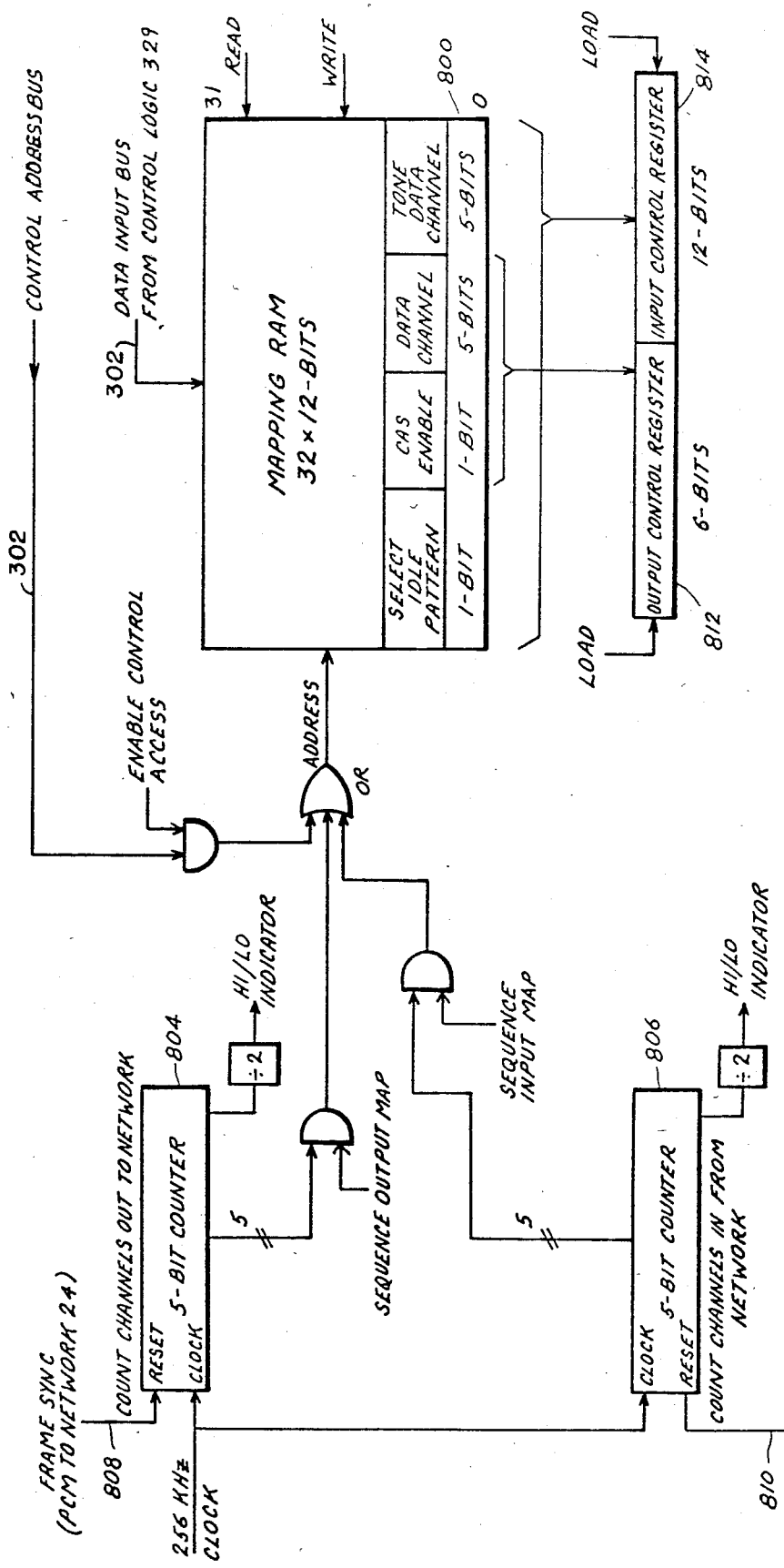
FIG. 11 is a CAS/DATA RAM control suitable for use in address generation and mapping read/write control for data transfer in and out of the CAS/DATA RAM.

Referring now to FIG. 11, a CAS/DATA RAM control 328 is described. The mapping RAM 800 consists of 32-locations by 12-bits and is accessed twice per channel time, once for the channel sent to the network 24 and once for the channel received from the network 24. Each direction has its own address counter 804 and 806 which is reset at each appropriate frame sync time coupled to counter 804 and 806 on lines 808 and 810 respectively. As a result of each read access to the mapping RAM 800, the data read is stored in buffer registers 812 and 814, one each for output and input directions of PCM flow.

The mapping RAM 800 has read and write access also from the control 34, via control logic 329, which writes the mapping patterns into the RAM 800, and can read them for test purposes. The RAM 800 is wider than 8-bits and may thus have to be addressed in two modes, by 12-bit width (32 locations) for channel mapping and a smaller control data width, e.g. by 8-bit width (64 locations, 32 half used) for access by control 34.

The 12-bit data width of the RAM 800 is preferably assigned as follows:
 one bit - select IDLE pattern to RAM 702
 one bit - select CAS channel
 5-bits - mapped data channel
 5-bits - mapped tone channel If the speech bus 302 is to have a channel mapping to the switch network PCM in the digital interface 22, this can be effected by a similar technique as has been described with reference to FIGS. 9, 10 and 11, and by extension of the mapping RAM 800 width to include a field of speech bus channel number.

When a channel of the network PCM is about to be transmitted to the switching network on line 602, that channel number as tracked by the counter 804 is addressed to read the mapping RAM 800, loading the read data from the RAM 800 to the output control register 812.

The control word in register 812 contains a CAS enable bit. If this is set, the speech field in the shift register 323a is loaded from the CAS RAM 1A (322), accessed from the multiframe address reached by the multiframe counter 600. CAS is also loaded into CAS RAM 2A (322) from the terminal 8-bit speech field in line 606 at the multiframe count address. The data field in DATA RAM 700 is loaded into the shift register 323a from the DATA RAM 700 address specified by the mapping RAM 800 data channel number previously loaded to the output control register 812.

When a channel of the network PCM is received on line 604 to shift register 323b, that channel number as tracked by the counter 806 is used as address to read the mapping RAM 800, loading the addressed content to the input control register 814. If the CAS enable bit is set, CAS is loaded to CAS RAM 1B (322) from the received speech field in shift register 323b, and CAS is also sent to the terminal from CAS RAM 2B (322) in the speech field on line 608. CAS RAM addresses are determined by the multiframe counter 600. The DATA RAM 702 is loaded from the 5-bit field in the received network PCM in shift register 323b if the tone data channel mapping address in input control register 814 is zero and the select idle pattern bit in register 814 is not set.

If the tone data channel field in input control register 814 is non-zero, then the tone data is read from a location addressed by that field in a RAM located in the retiming and sync, data and tone separation circuit 314 reference by FIG. 6, and loaded to the DATA RAM 702 in the location in RAM 702 addressed by the "data channel" field previously loaded to the input control register 814. If the select idle pattern bit is set, an idle pattern is put into the mapped location in the DATA RAM 702. This overrides the tone data channel field content implications present in register 814.

The read/write control and address mapping 328 also contains sequencers that control the various read and write accesses in fixed time slots synchronized to the network PCM framing, channel timing and 4.096 MH$_3$ clocks.

While the present invention has been described in connection with preferred embodiments thereof, it is to be understood that additional embodiments, modifications and applications which will become obvious to those skilled in the art are included within the spirit and scope of the invention as set forth by the claims appended hereto. For example, many modes of data transmission can be achieved with the present invention, using various known transmission interfaces. These include single termination to single termination, data only or data and voice concurrently. For data only, data could be at 64K-bits full duplex in the speech field or data could be transmitted at speech bandwidths by use of modems and transmitted in the speech field. For data and speech concurrently, data could be transmitted at 32K-bits and speech at 64K-bits full duplex by use of 5 spare bits in SPATA format; or if 32K-bit speech is coded and accepted, then 5 and 8 bit fields can be reversed such that 64K-bit data can be sent full duplex. For multiple terminations (greater than or equal to two) with or without common data base access, data can be transmitted in a conference mode with the following variations: the conference circuitry extracts data and performs store-and-forward, routing/switching or access/manipulation of a common database such that common data is returned to all terminations or switching of messages is performed between terminations. Full duplex paths are established between each termination and the conference circuit. For multiple terminations configured in a non-conference mode (with or without common database access), data can be transmitted between two terminations having direct voice connection, and data connection via a common database such that each termination receives the same returned data from the database or alternately so that each termination broadcasts (by use of a broadcast facility) the 16-bit channel with speech and data combined to both the other termination and the common database, and common data is returned via the tone bus which permits broadcast access on 30 channels to all terminals. Two terminations having direct voice connection and data connection via broadcast can be connected to one or more databases, such that each terminal receives different returned data.

In regard to the above where different modes of data transmission are mentioned, which can be accommodated by this invention, it is indicated that the invention will also allow the simultaneous voice and data communication as well as data base access when using a combined voice conference module and data base processing module. It is well known that there is a problem in most communication systems when one wishes to provide simultaneous data and voice transmission between multiple subscribers. Essentially, in order to implement the same, it is desired that a voice communication link exist between two users of the switchboard with an end-to-end duplex data link between them.

A further condition is that a voice link exists between two users with both users capable of sending data to a third port which may be connected to a data base processor and which will return the same or different data to each user. A third condition is the same as the above condition but where more than two users are involved which thereby can be represented by a conference feature for voice and a common data access point with adequate processing to enable all users to receive and return data as needed.

In existing communication systems, one may employ independent voice and data switching systems which is not an optimum solution since this approach increases the equipment distribution and maintenance costs.

In the above system, one can transmit the combined voice/channel field as the field combined by the digital interface shown in FIG. 6 from all connected users to a common switching port. The common port which also has a digital interface to separate the voice and the data field transmits the voice fields to a conference module and the data fields to a data base system. It is, of course, noted that the data base system is, for example, the system shown in FIG. 4 as 208 with the voice conference also being shown in FIG. 4 as 262.

Similarly, voice and data fields from the conference module and data base system are combined in the digital interface before transmission of the same to the connected users. In this system the digital interface can operate as explained to combine and split the data and voice fields at either end.

In the simple connection as shown in FIG. 1, subscriber 12 is coupled to subscriber 26 through two channels where one channel will transmit voice plus data from terminals 12 to 26 and the other channel will transmit voice plus data from terminal 26 to terminal 12. When voice conferencing and/or data base access are desired the connection shown, in FIG. 4 may be used with the digital interface combining and splitting voice and data fields.

In the event that only two subscribers are connected to the network, the digital interface 210 operates to split the data and voice fields and the voice fields would be looped or immediately connected to the other user. The separate data fields can be processed in the data base system, and either the same data or different data can be sent to each user.

In regard to the third problem mentioned above, the voice fields are processed by the voice conference module 262. In module 262 there exists the ability for the conference module to select one of the speech fields to return this field to all of the users or to behave in a manner as known conferencing modules. The data fields as processed in the data base system can be sent back to each user in the conference, or as indicated above, different data can be sent to each user. This entire description of the structure of FIG. 4 is explained in detail in the above specification. Essentially, the novelty in regard to the above path setups which can be implemented by this switching system lies in the combination of the voice conference module with the data base module at a single port on the switching network.

By doing this, one minimizes the number of paths used for the combined data voice communication function. The above noted switchboard is completely capable of implementing the above three modes of operation with great simplicity and, therefore, will allow simultaneous voice and data communication as well as data base access in using a combined voice conference and data base processing module as for example shown in FIG. 4.

The voice and data from the voice conference module 262 and the data base system 208 respectively as combined in the digital interface 210 in FIG. 4 may be returned to the ports and the subscribers via a tone bus as shown in FIG. 3 for data broadcasting via the tone bus. The digital interfaces at each port would then separate out the speech and data fields and direct them to the subscribers.

What is claimed is:

1. In a combined telecommunications and data communication system for combining and splitting speech and data for transmission through a digital switching network between two or more ports, said system including, digital interface means coupled to said ports for combining digitally encoded speech and data words from speech and data buses respectively for delivery to said ports in the same channel for bidirectional transmission between said ports and for splitting speech and data received in the same channel at a port for transmission on speech and data buses, a digital switching network coupled to said digital interface means for switching and transmitting digitally encoded speech and data simultaneously in the same channels between said ports, in combination therewith apparatus for receiving and transmitting speech and data to said ports, comprising:
a data base means, coupled to a predetermined port of said switching network and adapted to receive from the digital interface means associated with said predetermined port data emanating from any connected port of said switching network and to transmit data via said digital interface means and its associated port, and
voice conferencing means coupled to said predetermined port of said switching network and adapted to receive from said associated digital interface means speech emanating from any connected port of said switching network and to retransmit said speech via said digital interface means and its associated port, whereby the data base means and the voice conferencing means are both connected to a single network port so that the number of network channels and ports, required for voice conferencing and data base access is minimized.

2. The combined telecommunications and data communication system according to claim 1 wherein said data base means is coupled to said predetermined port via a data bus with said data bus coupled to said associated digital interface.

3. The combined telecommunications and data communications systems according to claim 1 wherein said voice conferencing means is coupled to said predetermined port via a speech bus with said speech bus coupled to said associated digital interface.

4. The combined telecommunications and data communications system according to claim 1 wherein said data base means is a computer.

5. The system according to claim 1 additionally comprising a tone bus coupled to said digital interface means for providing data to any port, said tone bus also being connected to a port for receiving data from said data base means, whereby data from the data base means may be broadcast to all ports via the tone bus.

6. The system according to claim 1 additionally comprising a tone bus coupled to receive data and speech emanating from said data base means and said voice conferencing module respectively and to transmit said data and speech simultaneously to the digital interface means associated with said ports.

7. The system according to claim 6 wherein said tone bus receives the data and speech via a port connected to said predetermined port.

8. The system according to claim 6 wherein said tone bus receives the data and speech directly from the digital interface means associated with the predetermined port.

9. A telecommunications and data communication system comprising:
a digital switching network,
a plurality of ports associated with said digital switching network said switching network capable of selectively connecting two or more of said ports
a plurality of subscriber lines connected to selected ones of said ports;
a data base means coupled to a predetermined port of said switching network and adapted to receive and transmit data from and to any connected port;
a voice conferencing means coupled to said predetermined port for receiving and transmitting speech; and
means disposed between said predetermined port and the voice conferencing means and the data base means for partitioning data and speech and directing the data to the data base means and the speech to the voice conferencing means and for receiving data and speech from the data base means and the voice conferencing means and combining said data and speech for transmission through said switching network, whereby a single port may be used for simultaneous voice conferencing and data base access.

* * * * *